United States Patent [19]

Kondo

[11] Patent Number: 5,145,100

[45] Date of Patent: Sep. 8, 1992

[54] SOLDERING APPARATUS

[75] Inventor: Kenshi Kondo, Tokyo, Japan

[73] Assignee: Nihon Den-Netsu Keiki Co., Ltd., Japan

[21] Appl. No.: 823,714

[22] Filed: Jan. 21, 1992

[30] Foreign Application Priority Data

Jan. 22, 1991 [JP] Japan .................. 3-20278

[51] Int. Cl.[5] ...................... B23K 35/38; B23K 20/14
[52] U.S. Cl. ......................... 228/42; 228/219; 228/221
[58] Field of Search ............ 228/42, 18, 47, 219, 228/221

[56] References Cited

U.S. PATENT DOCUMENTS

| 4,166,563 | 9/1979 | Peyraud et al. | 228/221 |
| 5,031,818 | 7/1991 | Gieskes | 228/42 |

FOREIGN PATENT DOCUMENTS

| 57-62859 | 4/1982 | Japan | 228/219 |
| 63-52764 | 3/1988 | Japan | 228/221 |

Primary Examiner—Kurt Rowna
Assistant Examiner—Jeffrey T. Knapp
Attorney, Agent, or Firm—Lorusso & Loud

[57] ABSTRACT

A soldering apparatus is disclosed which comprises a conveyor for moving print circuit boards along a predetermined path, an inert gas-filling chamber provided with a solder tank wherein the print circuit board is soldered in the inert gas atmosphere, primary and secondary, external air shutoff chambers positioned in front of and in rear of the inert gas-filling chamber, respectively. Both primary and secondary chambers are provided respectively with a first shutter having a mechanism for open/close action and capable of isolating the inside of the chambers from external air and with a second shutter having a mechanism for open/close action and capable of preventing release of the inert gas in the inert gas-filling chamber and are connected through a valve to a vacuum tank capable of evacuating the primary and secondary chambers. The inert gas-filling chamber is connected through a valve to each of the primary and secondary chambers for introducing the inert gas in the inert gas-filling chamber into the evacuated primary and secondary chambers.

1 Claim, 3 Drawing Sheets

SOLDERING APPARATUS

The present invention relates to a new soldering apparatus for print circuit boards carrying electronic parts and/or tip parts thereon, and more particularly to a soldering apparatus wherein a print circuit boards carrying electronic parts and/or tip parts temporarily fixed thereto is soldered under nonoxidative conditions while being conveyed in the atmosphere of an inert gas.

From the past, a soldering apparatus wherein a print circuit board carrying electronic parts and/or tip parts temporarily fixed thereto is soldered in an inert gas atmosphere comprises an inert gas-filling chamber provided with a soldering bath and filled with an inert gas supplied from a gas reservoir such as a gas bomb, an external air shutoff chamber provided at each of the front and rear part of the inert gas-filling chamber along the moving direction of the print circuit board, and a pair of shutters fitted to the external air shutoff chamber; one shutter capable of isolating external air and the other shutter capable of isolating an air-contaminated inert gas in the external air shutoff chamber. The air occupied in a soldering space of the apparatus is replaced by an inert gas to prevent oxidation of the solder paste with oxygen at a high temperature on soldering.

In such conventional soldering apparatus provided with the external air shutoff chamber, a shutter is opened or closed at the front end through which print circuit boards are introduced or at the rear end through which soldered print circuit boards are taken out, but there is no device for positively inhibiting release of the inert gas from the external air shutoff chamber through the opened shutter. Accordingly, external air including oxygen is intruded into the external gas shutoff chamber, and is intruded also into the inert gas-filling chamber filled with the inert gas by opening the shutter between both chambers so that the print circuit boards cannot be soldered in perfect inert gas atmosphere, thus raising a problem that molten solder cannot be prevented from oxidation or the concentration of flux cannot be lowered to facilitate cleaning of the print circuit boards. In order to effect soldering of the boards in the inert gas-filling chamber filled with the inert gas not contaminated with external air, therefore, the pressure of the inert gas in the chamber has to be elevated lest external air should be intruded into the chamber. In this case, however, a considerable amount of the inert gas is released from the chamber whenever the shutter is opened. Accordingly, the amount of the inert gas to be supplied will be increased to make the soldering operation economically unattractive. On the other hand, if a very small amount of external air is allowed to exist in the chamber, print circuit boards have previously to be painted with a flux. However, the flux is heated to evolve smoke by molten solder in the apparatus. Thus, there is an additional problem that compulsory expelling of smoke out of the apparatus accompanies concurrent expelling of the inert gas with the smoke.

In the above circumstances, there is a great demand in this art to develop a new soldering apparatus which can overcome the above mentioned problems.

It is an object of the present invention to provide a new soldering apparatus capable of preventing the inert gas-filling chamber filled with an inert gas and involving a solder bath from any intrusion of external air and capable of minimizing the amount of the inert gas released from the chamber. It is another object of the present invention to provide a soldering apparatus wherein the time for moving the print circuit boards is shortened notwithstanding the chamber is so specifically designed as to prevent intrusion of external air and release of an inert gas therefrom.

As a result of extensive research made to overcome the above mentioned problems, it has now been found by the present inventors that both of the intrusion of external air into the inert gas-filling chamber filled with an inert gas and the release of the inert gas from the chamber can be inhibited by providing the external gas shutoff chambers with separately functioning two shutters and with a vacuum tank for rapidly evacuating the inert gas contaminated with external air from the chambers, thus enabling the soldering operation of print circuit boards perfectly in inert gas atmosphere in the inert gas-filling chamber.

In accordance with the present invention, there is provided a soldering apparatus which comprises a plurality of conveying systems for moving print circuit boards carrying electronic parts and/or tip parts temporarily fixed thereto, an inert gas-filling chamber provided with a solder tank wherein the soldering of the print circuit boards is carried out in the inert gas atmosphere, a primary external air shutoff chamber positioned in front of the inert gas-filling chamber and a secondary external air shutoff chamber positioned in rear of the inert gas-filling chamber, characterized in that both primary and secondary external air shutoff chambers are provided respectively with a first shutter having a mechanism for open/close action and capable of isolating the inside of the chambers from external air and with a second shutter having a mechanism for open/close action and capable of preventing release of the inert gas in the inert gas-filling chamber and are connected through a valve to a vacuum tank capable of evacuating the chambers, and that the inert gas-filling chamber is connected through a valve to each of the primary and secondary external air shutoff chambers for introducing the inert gas in the inert gas-filling chamber into the evacuated primary and secondary external air shutoff chambers.

It is a feature of the present invention that the print circuit board can be soldered in the inert gas-filling chamber filled with an inert gas and involving a solder bath perfectly in the inert gas atmosphere and the amount of inert gas released from the chamber is rather small even when the second shutter is opened for introducing the board into the chamber.

It is another feature of the present invention that the inert gas contaminated with external air in the external air shutoff chambers can rapidly be evacuated by opening the valve to the vacuum tank and that the inert gas is introduced into the evacuated external air shutoff chambers from the inert gas-filling chamber filled with an inert gas so that the inner pressure of the external air shutoff chambers may be equal to that of the inert gas-filling chamber. In case the inner pressure of the external air shutoff chambers is equal to that of the inert gas-filling chamber, the open/close action of the second shutter becomes easy and smooth.

The inert gas used in the apparatus of this invention should not be reactive with either of the electronic tip parts and solder at a temperature for soldering. The use of a rare gas, such as neon or argon, carbon dioxide and nitrogen may be suitably used.

The present invention will more fully be understood from the detailed description given hereinbelow and the accompanying drawings which are given by way of illustration, and thus are not limitative of the present invention, and wherein.

Figure 1:
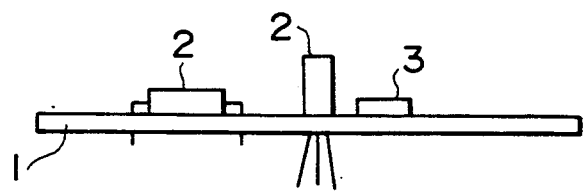
FIG. 1 is a side view of a print circuit board to be soldered according to the present invention.

In FIG. 1 showing a print circuit board to be treated with the apparatus of this invention, the reference numeral 1 is a print circuit board, 2 electronic parts with lead wires and 3 electronic tip parts. These electronic parts 2 and/or tip parts 3 are temporarily fixed to the board 1 by way of an adhesive.

Figure 2:
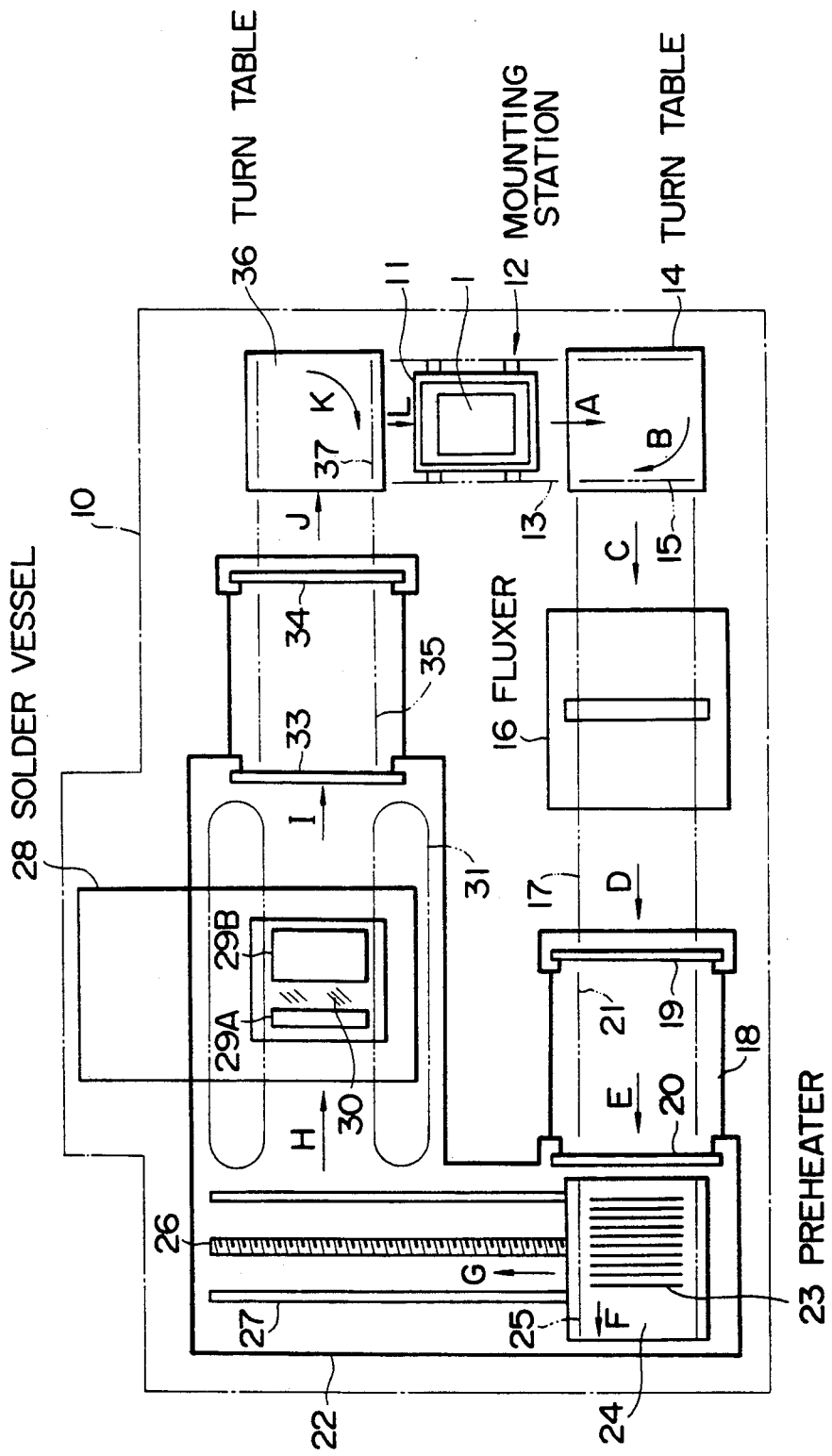
FIG. 2 is a schematic explanatory drawing showing an example of the soldering apparatus of this invention.

In FIG. 2 showing the structure of one example of the soldering apparatus of this invention, the reference numeral 10 is a whole body of the soldering apparatus, 11 a carrier mounting the board 1 thereto, 12 a mounting section where the work for mounting the print circuit board 1 to the carrier 11 is done, 13 a conveying means in the mounting section 12, 14 a turn table where the moving direction of the carrier 11 shown by the arrow mark A is turned rectangularly as shown by the arrow mark B to the direction shown by the arrow mark C, 15 a conveying means for the turn table 14 moving in the direction shown by the arrow mark C, 16 a fluxer where the board 1 is treated with a flux, 17 a conveying means in the fluxer section capable of moving the carrier in the direction shown by the arrow mark D, 18 a primary external air shutoff chamber provided with a first shutter 19 and a second shutter 20, 21 a conveying means in the primary external air shutoff chamber 18 capable of moving the carrier in the direction shown by the arrow mark E, and 22 an L-shaped inert gas-filling chamber. The chamber 22 is usually filled with an inert gas such as nitrogen and includes a preheater 23, a cart 24 provided with the preheater 23, a conveying means 25 capable of moving the cart 24 in the direction shown by the arrow mark F, a screw rod 26 engaged with the lower part of the cart 24, a guide shaft 27 fitted to the cart 24, a solder tank 28 a part of which is enclosed in the chamber 22, a first ejecting tank 29A of the solder tank 28, a second ejecting tank 29B of the solder tank 28, a molten solder 30, and a conveying means 31 in the solder tank 28 capable of moving the carrier in the direction shown by the arrow marks H and I. In the chamber 22, the print circuit board 1 is heated up to the temperature of molten solder 30 whereby the soldering operation of the board is finished. The reference numeral 32 is a secondary external air shutoff chamber provided with a third shutter 33 and a fourth shutter 34, 35 a conveying means in the chamber 32 capable of moving the carrier in the direction shown by the arrow mark I, 36 a turn table where the carrier is turned rectangularly as shown by the arrow mark K and 37 a conveying means in the turn table 36. The conveying means 13, 15, 17, 21, 25, 31, 35 and 37 are engaged with the carrier 11 and are capable of moving the carrier in the indicated directions. A typical example of the conveying means is a chain conveyer. The shutters 19, 20, 33 and 34 are devised to open only when the carrier is passed therethrough.

Figure 3:
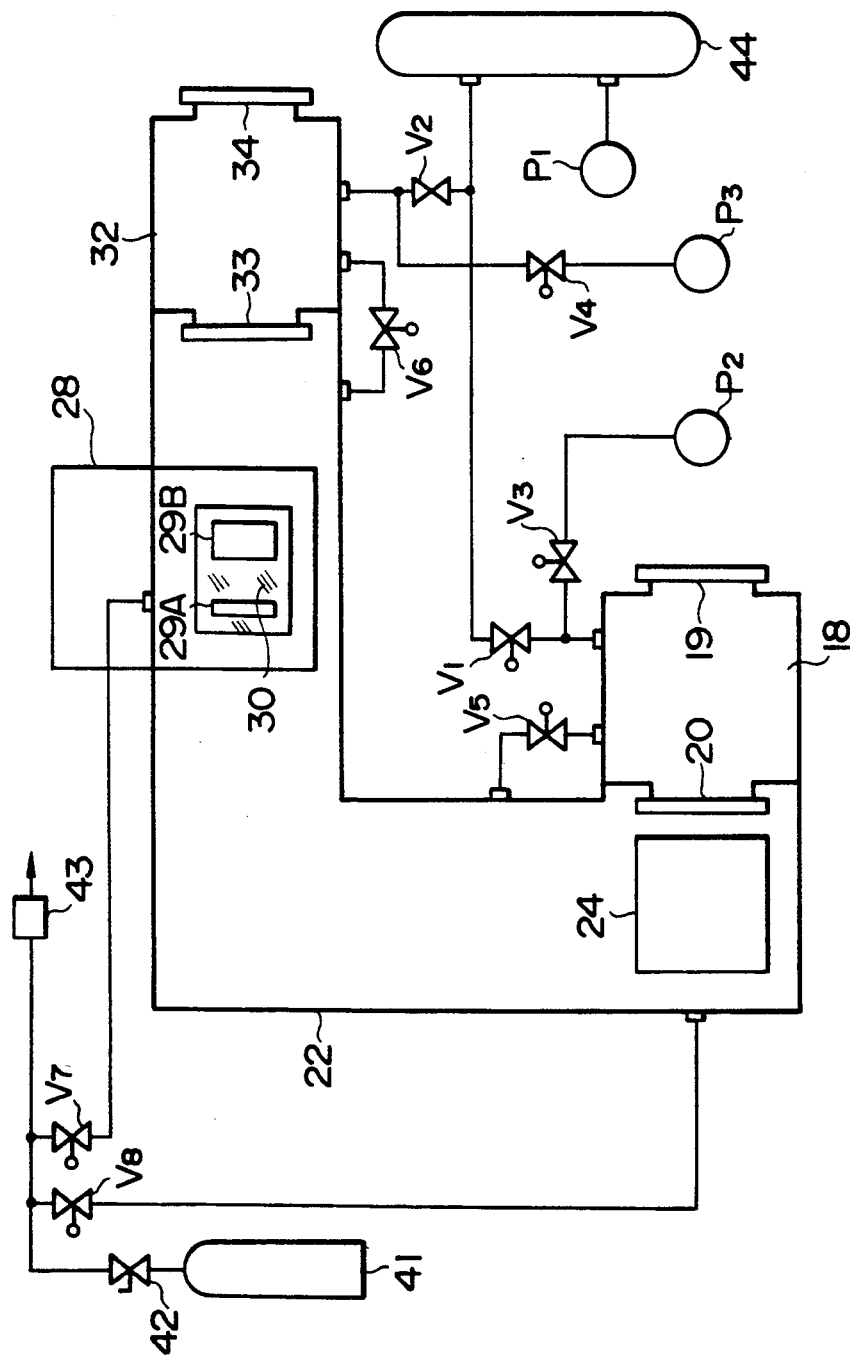
FIG. 3 is a schematic diagram showing a pipe line system of the apparatus shown in FIG. 2.

In FIG. 3, the same reference numerals as shown in FIGS. 1 and 2 have the same meanings as given above. The reference numeral 41 is a gas bomb or the like gas reservoir as a supply source of an inert gas, 42 a cock of the bomb or reservoir, 43 a safety valve, and 44 a vacuum tank for evacuating the external air shutoff chambers 18 and 32 thereby rapidly eliminating the inert gas contaminated with external air occupied in the chambers. The vacuum tank 44 is connected to a vacuum pump $P_1$ which is capable of sucking air from the tank to maintain it under vacuum at all times. In addition to the vacuum tank 44, evacuating pumps $P_2$ and $P_3$ are provided to evacuate any remaining gas in the external air shutoff chambers 18 and 32, respectively. Pipe lines connecting these pumps, chambers and tanks are provided with valves $V_1$-$V_8$ capable of regulating the rate of gas flow.

Figure 4:
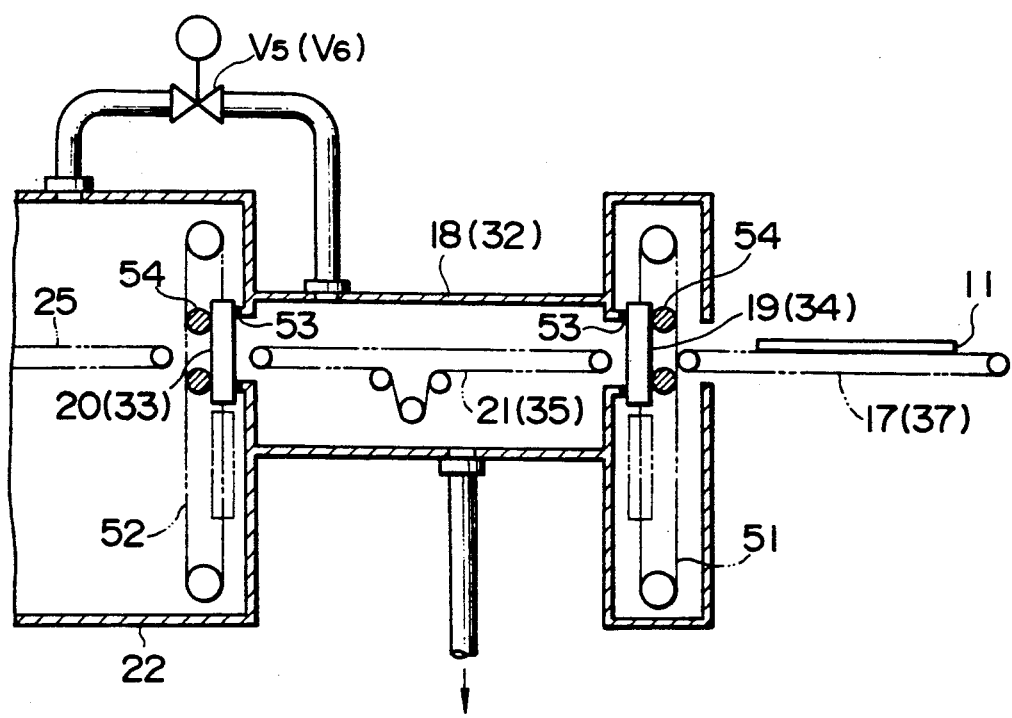
FIG. 4 is a side cross section showing the main part of the apparatus shown in FIG. 2.

In FIG. 4, the same reference numerals as shown in FIGS. 1–3 have the same meanings as given above. The reference numerals 51 and 52 are drive chains capable of open/close action of the shutters 19, 20, 33 and 34, 53 a packing, and 54 eccentric shafts rotatable for pressing the shutters 19, 20, 33 and 34, in the closed position, against the packing 53 to maintain each of the external air shutoff chambers 18 and 32 air-tight. This shaft has an elliptical form in cross section. An ordinary rod provided with a cam of an elliptical form in cross section may also be used as the shaft 54.

Referring now to FIGS. 2–4, the process for soldering of print circuit boards is explained in accordance with the soldering apparatus 10 of this invention.

In FIG. 2, the print circuit board 1 is mounted onto the carrier 11 in the mounting section 12 and the carrier 11 is moved in the direction shown by the arrow mark A and transferred to the chain conveyer 15 of the turn table 14. Next, the turn table 14 is rotated rectangularly in the direction shown by the arrow mark B, whereby the moving direction of the carrier 11 is also rotated rectangularly. The carrier 11 is transferred to the chain conveyer 17 and moved in the direction shown by the arrow mark C to the fluxer 16 where the board 1 is subjected to a flux treatment. After confirming that the carrier has not yet been entered in the primary external air shutoff chamber 18 by way of a senser (not shown), the first shutter 19 is opened to move the carrier 11 in the direction shown by the arrow mark D and the carrier 11 is allowed to stop after transferring the chain conveyer from 17 to 21. At this stage, the first shutter 19 is closed and the valve $V_1$ shown in FIG. 3 is opened whereby the air occupied in the chamber 18 is removed rapidly by suction to the vacuum tank 44 which has previously been evacuated by the action of the pump $P_1$. In addition, the pump $P_2$ is driven and the valve $V_3$ is opened to eliminate any remaining air from the chamber 18. The valves $V_1$ and $V_3$ is then closed to maintain the chamber 18 under reduced pressure. At this stage, the valve $V_5$ is opened to introduce an inert gas into the chamber 18 from the inert gas-filling chamber 22 previously filled with the inert gas supplied from the gas bomb or reservoir 41 through the valve $V_8$ whereby the gas pressure in the chamber 18 becomes equal to that in the chamber 22, thus making the difference in pressure between both chambers null to facilitate opening of the second shutter 20. The inert gas can directly be introduced into the chamber 18 from the gas bomb or reservoir 41. In this case, however, a device for measuring the pressure will be necessary in order to make the pressure in the chamber 18 equal to that in the chamber 22. Accordingly, the direct introduction of an inert gas into the chamber 18 from the gas bomb 41 is not desirable in view of increase in cost and labor. The second shutter 20 is then opened to move the carrier 11 in the direction shown by the arrow mark E, and the carrier is transferred to the chain conveyer 25 moving in the direction shown by the arrow mark F from the chain conveyer 21. The carrier 11 is placed on the cart 24 provided with the preheater 23 and is preliminarily heated while being moved on the cart. A motor (not shown) is then driven to rotate the screw rod 26 whereby the cart 24 is moved in the direction shown by the arrow mark G along the guide shaft 27. After the cart 24 is stopped in a predetermined position, the carrier 11 is transferred to the chain conveyer 31 capable of moving in the direction shown by the arrow mark H, i.e. in the reverse direction to the arrow mark F, and is conveyed to the soldering tank 28 where the board 1 is contacted with waves of molten solder 30 formed by the first and second solder applicators 29A and 29B. The third shutter 33 of the secondary external air shutoff chamber 32 is then opened and the carrier 11 is moved towards the direction shown by the arrow mark I and transferred to the chain conveyer 35 in the chamber 32 previously filled with the inert gas in the same manner as described above in the chamber 18. The third shutter 33 is closed at this stage and the fourth shutter 34 is opened. The carrier 11 is moved out of the chamber 32 in the direction shown by the arrow mark J and placed on the turn table driven by the chain conveyer 37. After rotating the turn table rectangularly in the direction shown by the curved arrow mark K, the carrier 11 is moved in the direction shown by the arrow mark L and transferred to the original chain conveyer 13. A cycle of the movement of the carrier 11 in the apparatus 10 is finished at this stage and the soldered print circuit board 1 is thus replaced by a new print circuit board.

When the fourth shutter 34 is opened, external air is intruded into the chamber 32 and contaminates the inert gas occupied therein. Accordingly, the third and fourth shutters 33 and 34 are closed after the exit of the print circuit board and the chamber 32 is evacuated by opening the valves $V_2$ and $V_4$ under the action of the pump $P_3$ whereby the inert gas contaminated with external air flows to the vacuum tank 44 and to the pump $P_3$ for venting.

When the valves $V_5$ and $V_6$ are opened, the inert gas in the chamber 22 is supplied to the evacuated external air shutoff chambers 18 and 32 whereby the inner pressure of the chambers 18 and 32 are kept equal to that of the chamber 22. When a senser (not shown) detects reduction in the pressure of the inert gas in the chamber 22, the valves $V_7$ and $V_8$ are opened to supply the inert gas from the gas bomb or reservoir 41.

The temperature of the soldered print circuit boards is depressed and the molten solder is solidified as soon as they are taken out of the apparatus so that the electronic parts and/or tip parts are finally fixed to the boards. In the event the print circuit boards thus soldered have lead wires extended from the bottom surface thereof, the boards can be treated in a conventional manner for cutting the extending lead wires.

It is a characteristic gist of the present invention that the inert gas-filling chamber where the soldering operation of print circuit boards is carried out is provided in both front and rear stages thereof with the external air shutoff chambers.

It is another characteristic gist of the present invention that the primary and secondary external air shutoff chambers are respectively provided with two shutters; one being capable of inhibiting intrusion of external air into the chamber and the other being capable of inhibiting release of the inert gas from the inert gas-filling chamber.

It is still another characteristic feature of the present invention that the external gas shutoff chambers can be evacuated rapidly by using the vacuum tank and the vacuum pumps so that the inert gas contaminated with external gas which is intruded every time the first and third shutters are opened is removed from the chambers.

In the apparatus of this invention, these characteristic gists bring about various merits. Firstly, the amount of the inert gas to be supplied to the inert gas-filling chamber can be minimized as the second and fourth shutters prevent release of a large amount of the inert gas as a result of a combination play of the first and third shutters. Secondly, the chambers filled with the inert gas contaminated with external air can be evacuated rapidly by utilizing the vacuum tank and the vacuum pump, so that the time required for moving the print circuit boards and for the soldering operation itself can significantly shortened. In addition, the valve connecting the inert gas-filling chamber and the external air shutoff chambers is opened to make the difference in pressure between these chambers null so that the open/close operation of the second and fourth shutters can smoothly be made and no further device nor expense becomes unnecessary for measuring the pressure.

What is claimed is:

1. A soldering apparatus comprising:
   means for conveying a printed circuit board through a predetermined path;
   an air-tight treatment chamber located in said path;
   a source of an inert gas;
   a supply conduit extending between said treatment chamber and said inert gas source and provided with a feed valve operable to permit the inert gas to be fed from said inert gas source to said treatment chamber and to maintain the pressure within said treatment chamber within a predetermined range;
   means provided within said treatment chamber for applying a molten solder to a printed circuit board traveling through said path;
   a primary chamber disposed upstream of and contiguously to said treatment chamber;
   a secondary chamber disposed downstream of and contiguously to said treatment chamber;
   evacuating means;
   a first conduit extending between said primary chamber and said evacuating means and provided with first valve means operable to permit and prevent the gas communication between said primary chamber and said evacuating means;
   a second conduit extending between said secondary chamber and said evacuating means and provided with second valve means operable to permit and prevent the gas communication between said secondary chamber and said evacuating means;
   a third conduit extending between said primary chamber and said treatment chamber and provided with third valve means operable to permit and prevent the gas communication between said primary chamber and said treatment chamber;
   a fourth conduit extending between said secondary chamber and said treatment chamber and provided with fourth valve means operable to permit and prevent the gas communication between said secondary chamber and said treatment chamber;

a first shutter provided in the upstream end of said primary chamber and movable between open and close positions so that the printed circuit board can enter said primary chamber when said first shutter is in said open position and ambient air is prevented to flow into said primary chamber therethrough when said first shutter is in said close position;

a second shutter provided between said primary chamber and said treatment chamber and movable between open and close positions so that the printed circuit board in said primary chamber can pass to said treatment chamber therethrough when said second shutter is in said open position and the inert gas within the treatment chamber is prevented to flow into said primary chamber therethrough when said second shutter is in said close position;

a third shutter provided between said secondary chamber and said treatment chamber and movable between open and close positions so that the printed circuit board in said treatment chamber can pass to said secondary chamber therethrough when said third shutter is in said open position and the inert gas within the treatment chamber is prevented to flow into said secondary chamber therethrough when said third shutter is in said close position; and a fourth shutter provided in the downstream end of said secondary chamber and movable between open and close positions so that the printed circuit board can exit said secondary chamber when said fourth shutter is in said open position and ambient air is prevented to flow into said secondary chamber therethrough when said fourth shutter is in said close position;

whereby the printed circuit board is passed successively through said primary chamber, treatment chamber and secondary chamber and is soldered during passage through said treatment chamber in the atmosphere of the inert gas with the inert gas within said treatment chamber being discharged therefrom in such an amount as to equalize the pressure within said primary and secondary chambers, evacuated when the printed circuit board is present therewithin, with that within said treatment chamber.

* * * * *